(12) United States Patent
Joswig et al.

(10) Patent No.: US 8,507,120 B2
(45) Date of Patent: Aug. 13, 2013

(54) ROUND CELL BATTERY

(75) Inventors: Ralf Joswig, Buchholz (DE); Martin Wiegmann, Borstel (DE); Helge Brenner, Hannover (DE)

(73) Assignee: Johnson Controls Hybrid and Recycling GmbH, Hannover (DE)

( * ) Notice: Subject to any disclaimer, the term of this patent is extended or adjusted under 35 U.S.C. 154(b) by 0 days.

(21) Appl. No.: 12/769,582

(22) Filed: Apr. 28, 2010

(65) Prior Publication Data

US 2010/0266886 A1 Oct. 21, 2010

Related U.S. Application Data

(63) Continuation of application No. PCT/EP2008/008712, filed on Oct. 15, 2008.

(30) Foreign Application Priority Data

Oct. 31, 2007 (DE) .......................... 10 2007 052 330

(51) Int. Cl.
*H01M 10/50* (2006.01)

(52) U.S. Cl.
USPC .......................................................... 429/120

(58) Field of Classification Search
USPC .......................................................... 429/120
See application file for complete search history.

(56) References Cited

U.S. PATENT DOCUMENTS

| | | | |
|---|---|---|---|
| 6,512,347 B1 * | 1/2003 | Hellmann et al. | 320/107 |
| 2002/0064707 A1 * | 5/2002 | Wessman | 429/120 |
| 2002/0125860 A1 * | 9/2002 | Schworm et al. | 320/150 |
| 2003/0013009 A1 * | 1/2003 | Dansui et al. | 429/120 |
| 2003/0017383 A1 * | 1/2003 | Ura et al. | 429/120 |
| 2007/0259261 A1 | 11/2007 | Rejman et al. | |
| 2008/0305388 A1 | 12/2008 | Haussamn | |
| 2009/0004557 A1 * | 1/2009 | Lasarov et al. | 429/122 |
| 2009/0023056 A1 * | 1/2009 | Adams et al. | 429/120 |

FOREIGN PATENT DOCUMENTS

| | | |
|---|---|---|
| DE | 10223782 A1 | 12/2003 |
| DE | 10 2004 005 394 A1 | 8/2005 |
| DE | 10 2007 009 315 A1 | 8/2007 |
| EP | 0 917 230 A1 | 5/1999 |
| EP | 1191616 A1 | 3/2002 |
| EP | 1237209 A1 | 9/2002 |
| EP | 1274137 B1 | 9/2008 |

OTHER PUBLICATIONS

International Preliminary Report on Patentability for International Application No. PCT/EP2008/008712, dated May 14, 2010, 7 pages.

(Continued)

*Primary Examiner* — Patrick Ryan
*Assistant Examiner* — Muhammad Siddiquee
(74) *Attorney, Agent, or Firm* — Foley & Lardner LLP

(57) ABSTRACT

A round cell rechargeable battery includes a plurality of round cells arranged alongside one another and at least one output element that is electrically insulated from the round cells. The at least one output element is in the form of a rod and is curved such that the output element runs in a zigzag shape alternately along a lower face, a side wall adjacent thereto, and an upper face of the round cells and thermally conductively connects a group of the round cells for heat dissipation.

12 Claims, 13 Drawing Sheets

(56) References Cited

OTHER PUBLICATIONS

International Preliminary Report on Patentability and English translation of the Written Opinion for International Application No. PCT/EP2008/008712, dated Jul. 1, 2010, 7 pages.

International Search Report for Application No. PCT/EP2008/008712, mailing date Feb. 4, 2009, 4 pages.

Non Final Office Action in U.S. Appl. No. 12/980,826 mailed Nov. 26, 2012.

* cited by examiner

ROUND CELL BATTERY

CROSS-REFERENCE TO RELATED PATENT APPLICATIONS

The present application is a Continuation of International Application PCT/EP2008/008712, filed Oct. 15, 2008, which claims priority to German Application DE 10 2007 052 330.2, filed Oct. 31, 2007. The entire disclosures of International Application PCT/EP2008/008712 and German Application DE 10 2007 052 330.2 are incorporated herein by reference.

BACKGROUND

The invention relates to a round cell rechargeable battery.

EP 0 917 230 B1 discloses a rechargeable battery having a temperature-regulating apparatus.

DE 10 2004 005 394 A1 describes an electrochemical energy store.

DE 102 23 782 B4 discloses a battery having at least one electrochemical storage cell and a cooling device, through which a liquid cooling medium flows. The storage cells are held in openings in the cooling devices and make a force-fitting contact in places with in each case one outer surface, which is curved in a direction at right angles to the longitudinal axis of the storage cell. An expansion joint is provided in the areas of the force-fitting contact.

DE 10 2007 009 315 A1 discloses an apparatus for cooling electrical elements with conductor bodies which are in thermal contact with side surfaces of the electrical elements, in order to dissipate heat.

Heat dissipation is a problem in an electrical rechargeable battery with round cells. This problem is made worse because the cell cup is at an electrical potential.

The object of the present invention is therefore to provide an improved round cell rechargeable battery.

DETAILED DESCRIPTION

The object is achieved by specifically shaped metallic output plates. The outer contact surface of the cups of the round cells or the contact surface of the output elements is or are also provided with an electrically insulating coating, for example with thermally conductive lacquer of specific plastic film. The insulating output elements can also be produced from a thermally conductive electrically insulating plastic. The thermally conductive plastic may, for example, be filled with ceramic. By way of example, boron nitride is suitable for use as a ceramic filling.

Tubes for the coolant are mounted in the output elements and may be formed, for example, from aluminum or steel.

The metallic output elements themselves may, for example, be formed from copper or aluminum heat sinks The use of extruded parts is particularly suitable.

All contact surfaces can be provided with a thermally conductive paste, a thermally conductive gel or a thermally conductive adhesive in order to improve the heat transfer. By way of example, the product Alphagel from the Geltec company or the product Keratherm® from the Kerafol company are suitable for this purpose.

The invention will be described in more detail in the following text with reference to the attached drawings.

Figure 1:
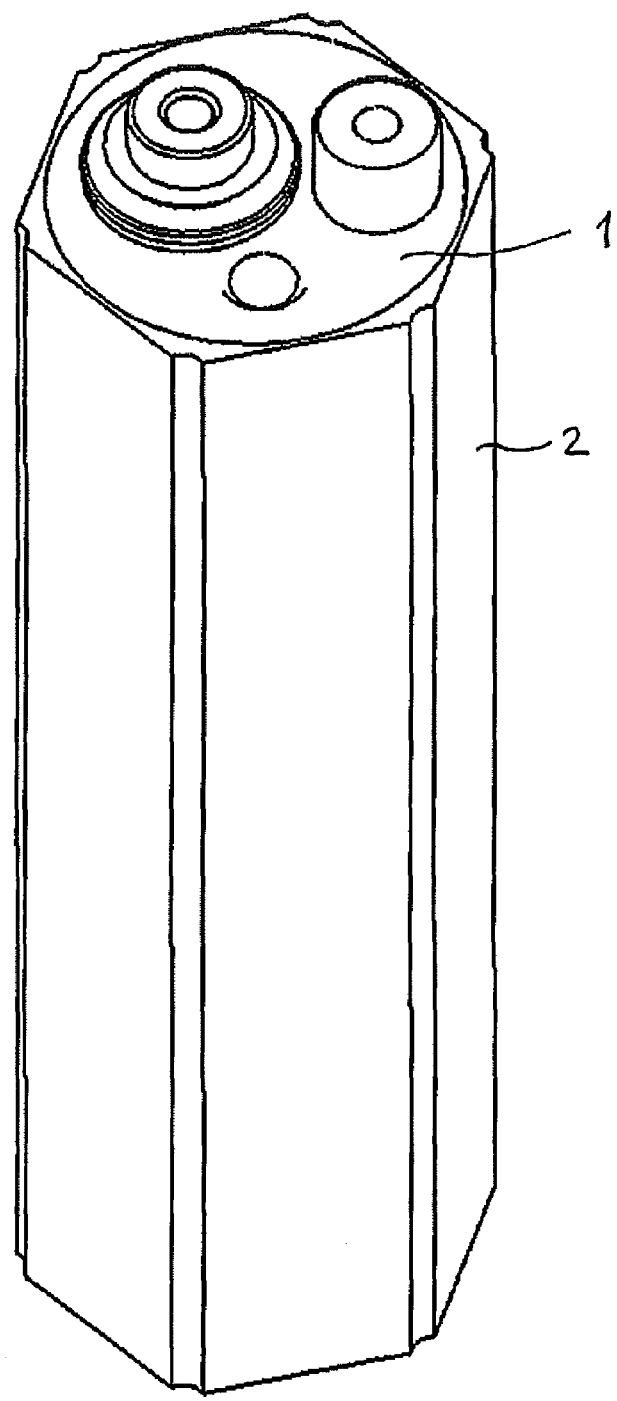
FIG. 1 shows a perspective view of a round cell which is installed in a hexagonal housing.

FIG. 1 shows a perspective view of a round cell which is installed in a hexagonal housing 2 which has a cylindrical area for holding the round cell 1. The edges of the housing 2 are provided with grooves for holding output elements.

Figure 2:
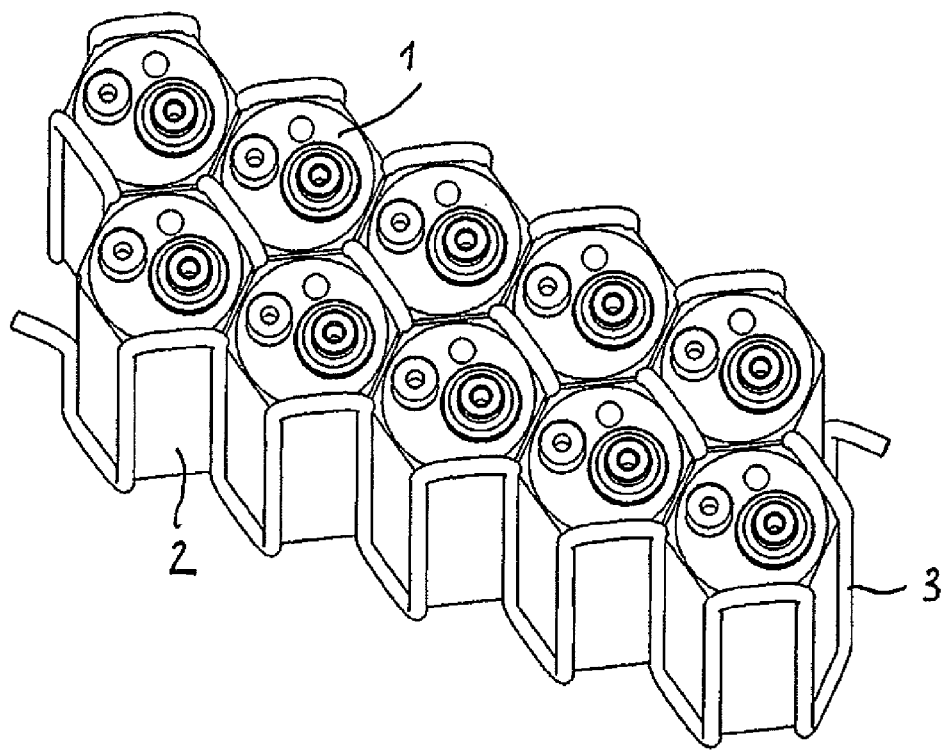
FIG. 2 shows a perspective view with a number of round cells which are arranged adjacent to one another and are held in a respective housing.

FIG. 2 shows a perspective view with a number of round cells 1 which are arranged adjacent to one another and are held in a respective housing 2. The output elements 3 which are in the form of a curved round rod can be seen. The round rod is curved such that it runs along a lower edge or upper edge to form a side edge, in order to merge at an upper edge or lower edge. The output elements 3 have a zigzag-shaped profile and are introduced into the grooves on the side edges of the housing 2.

Figure 3:
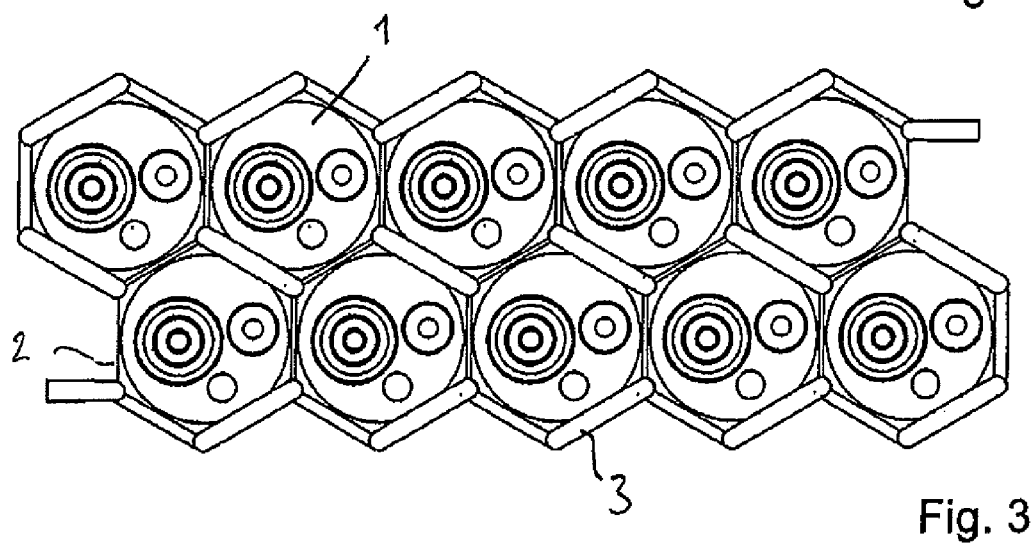
FIG. 3 shows a plan view of the round cell arrangement from FIG. 2.

FIG. 3 shows a plan view of the round cell arrangement from FIG. 2.

Figure 4:
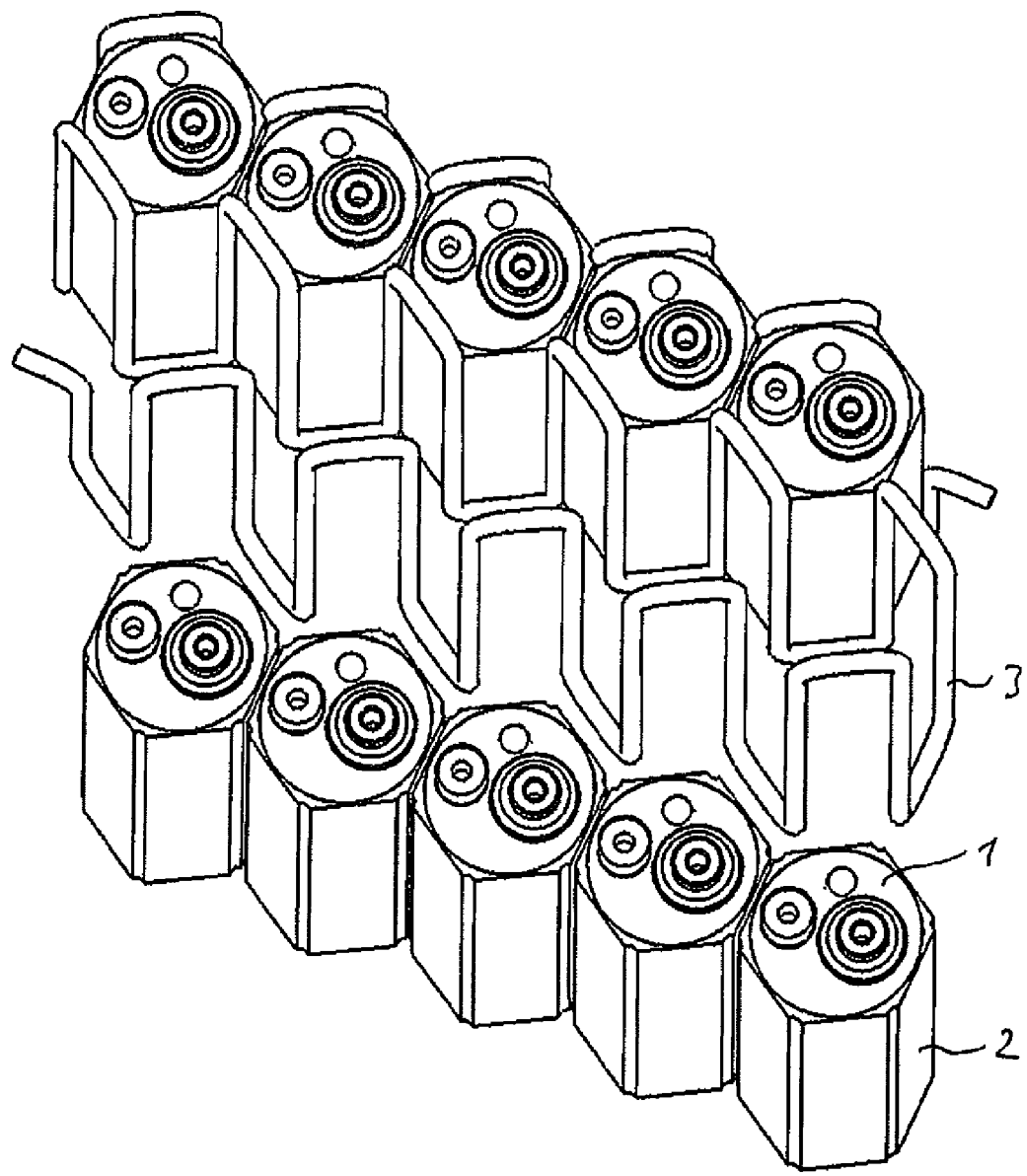
FIG. 4 shows an exploded view, in which the round cells which are arranged alongside one another are introduced from underneath into the cage formed by the zigzag-shaped output elements.

FIG. 4 shows an exploded view, in which the round cells 1 which are arranged alongside one another are introduced from underneath into the cage formed by the zigzag-shaped output elements 3.

Figure 5:
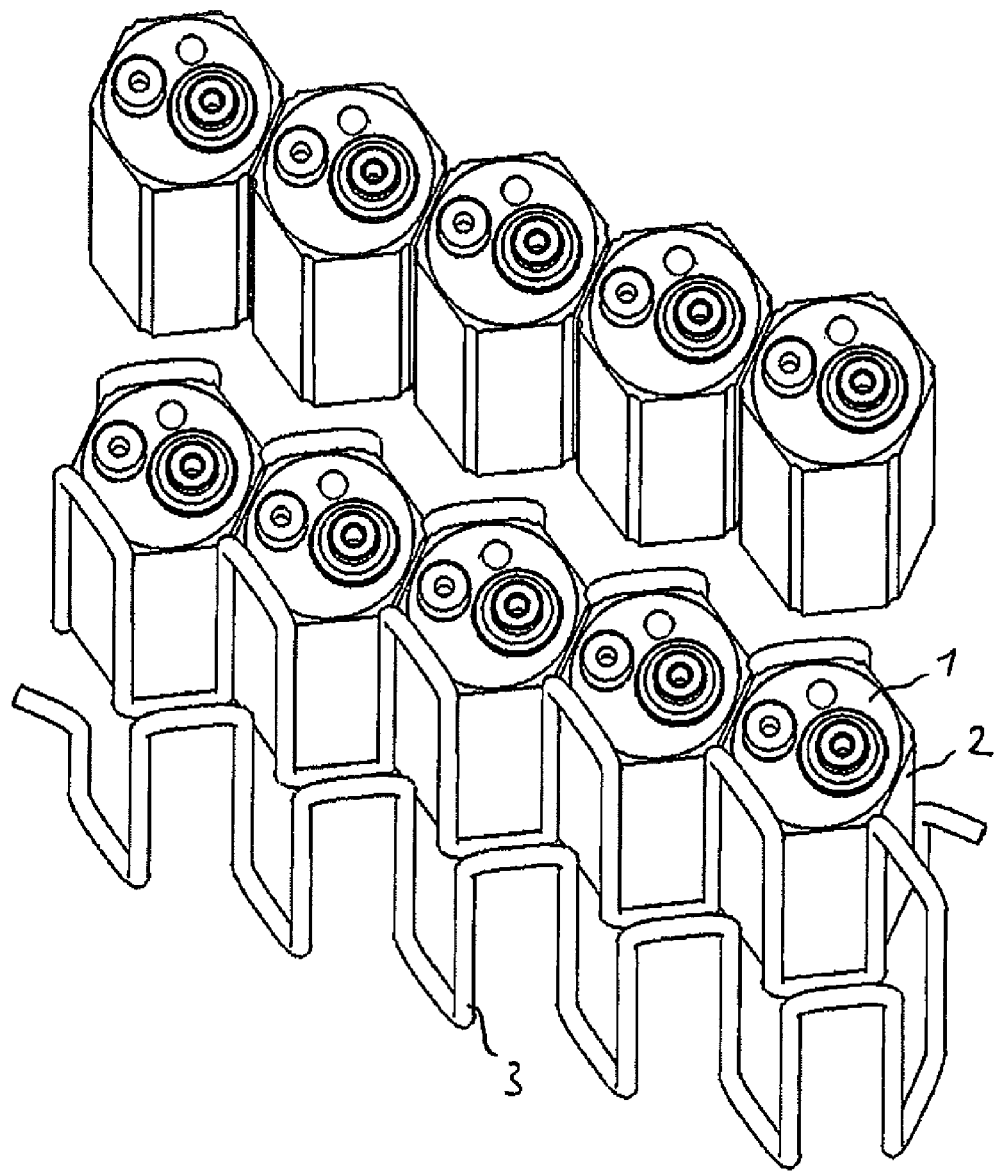
FIG. 5 shows a corresponding view, in which the round cells fitted to the respective housing are introduced from above into the cage formed by the zigzag-shaped output elements.

FIG. 5 shows a corresponding view, in which the round cells 1 fitted to the respective housing 2 are introduced from above into the cage formed by the zigzag-shaped output elements.

Figure 6:
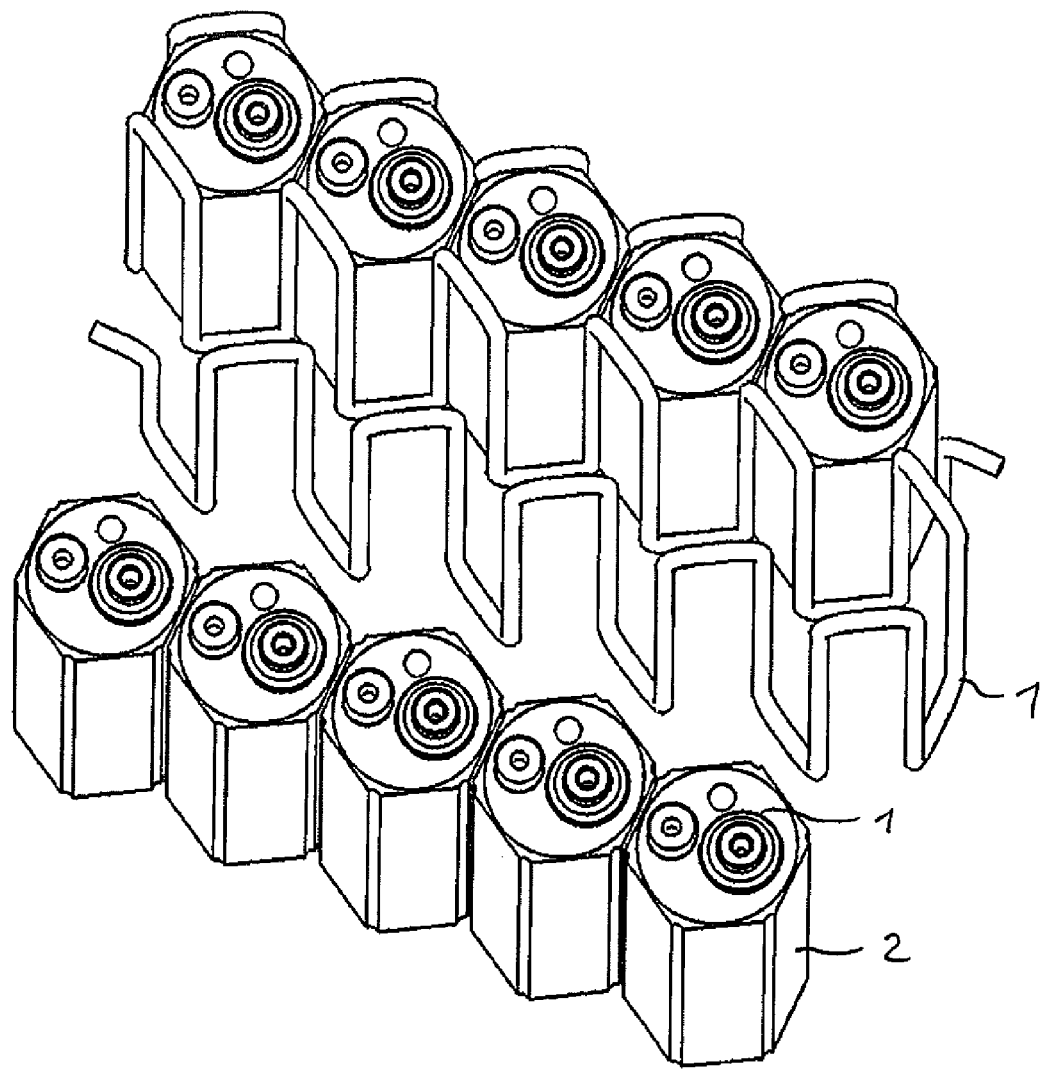
FIG. 6 shows a similar exploded view.

FIG. 6 shows a similar exploded view.

Figure 7:
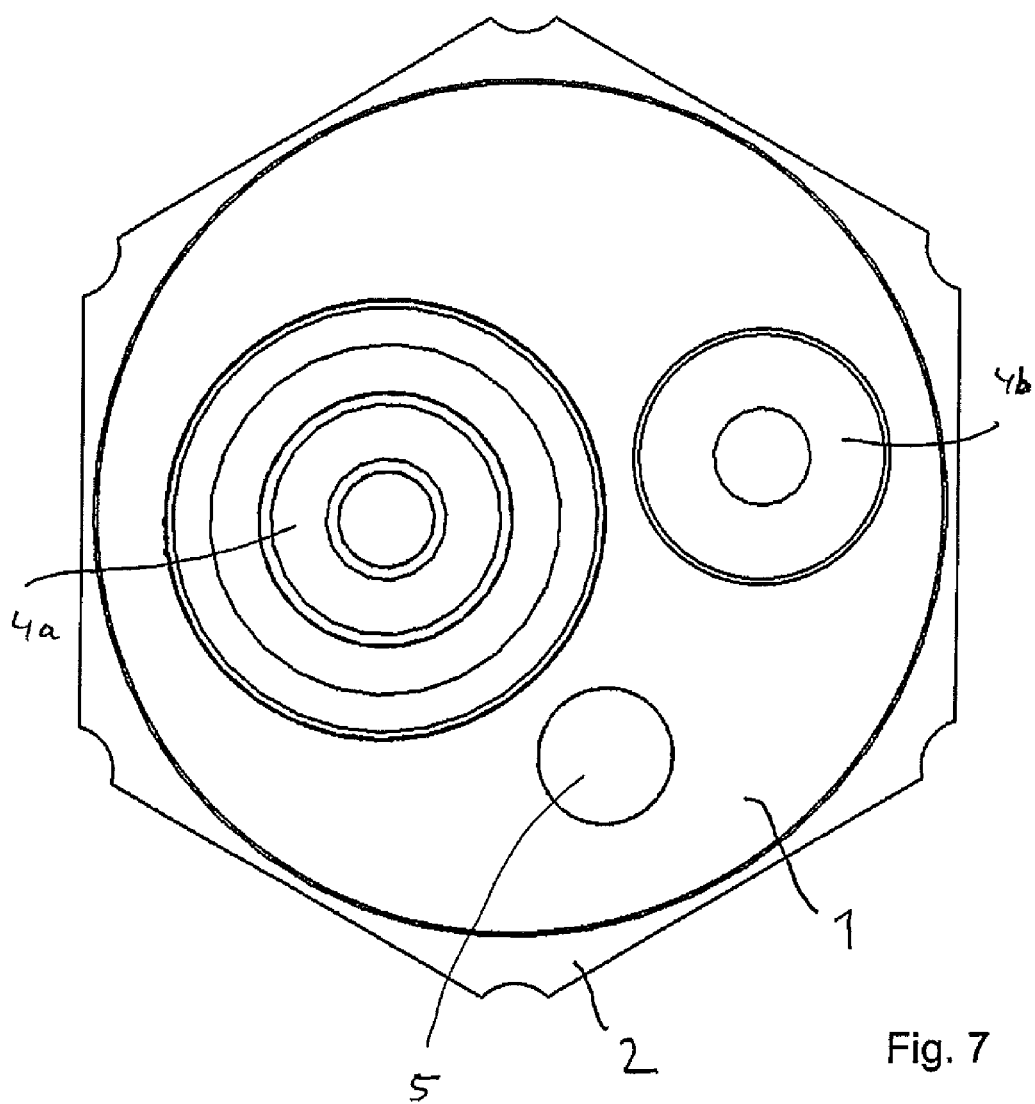
FIG. 7 shows a plan view of a housing with a round cell that has been introduced into it.

FIG. 7 shows a plan view of a housing 2 with a round cell 1 that has been introduced into it. In addition to the pole connections 4a, 4b for the positive and negative poles, a degassing valve 5 is also provided, in a manner known per se.

Figure 8:
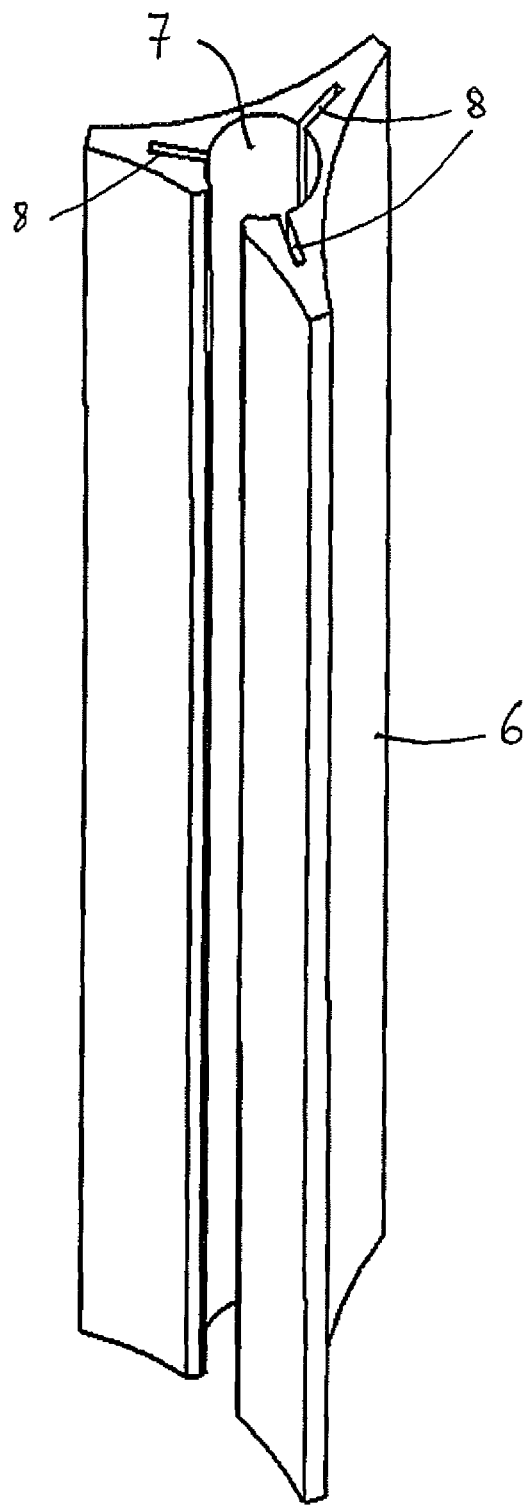
FIG. 8 shows a metallic output element which is produced from an extruded part and has curved outer walls to which the outer walls of the round cells are connected.

FIG. 8 shows a metallic output element 6 which is produced from an extruded part and has curved outer walls to which the outer walls of the round cells 1 are connected. A hole for holding the output element 3, which is in the form of a rod, is located in the center of the output elements 6. Incisions 8 project radially from the holes into the output element 6, in order to achieve better cooling and flexibility.

Figure 9:
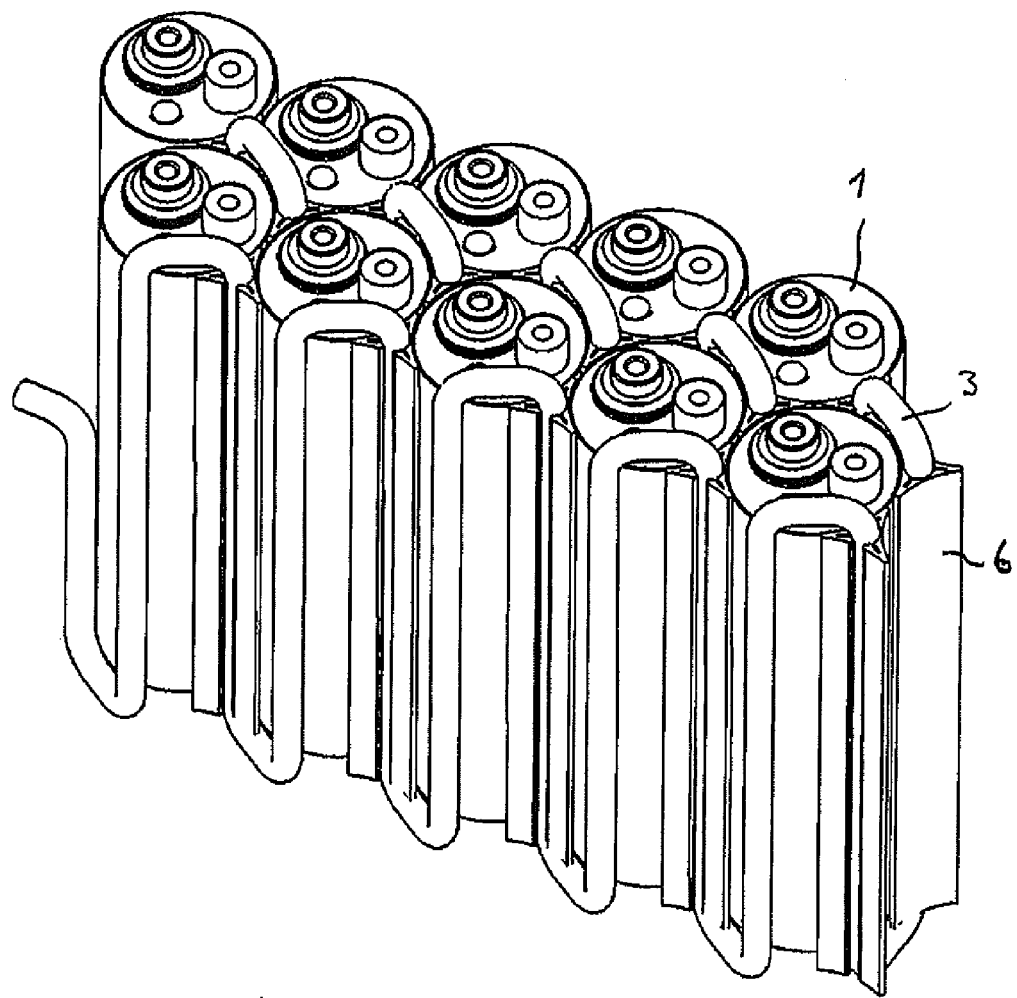
FIG. 9 shows an embodiment of a rechargeable battery in which the round cells are not inserted into a respective housing but into a holder which is formed by the output elements in conjunction with the round rods.

FIG. 9 shows an embodiment of a rechargeable battery in which the round cells 1 are not inserted into a respective housing 2 but into a holder which is formed by the output elements 6 in conjunction with the round rods 3.

Figure 10:
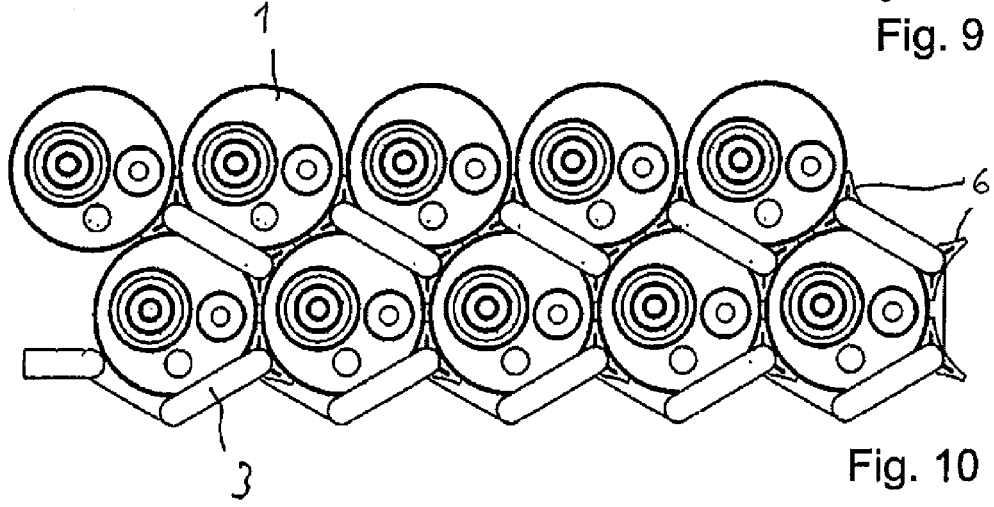
FIG. 10 shows a plan view of the rechargeable battery arrangement shown in FIG. 9.

FIG. 10 shows a plan view of the rechargeable battery arrangement shown in FIG. 9.

Figure 11:
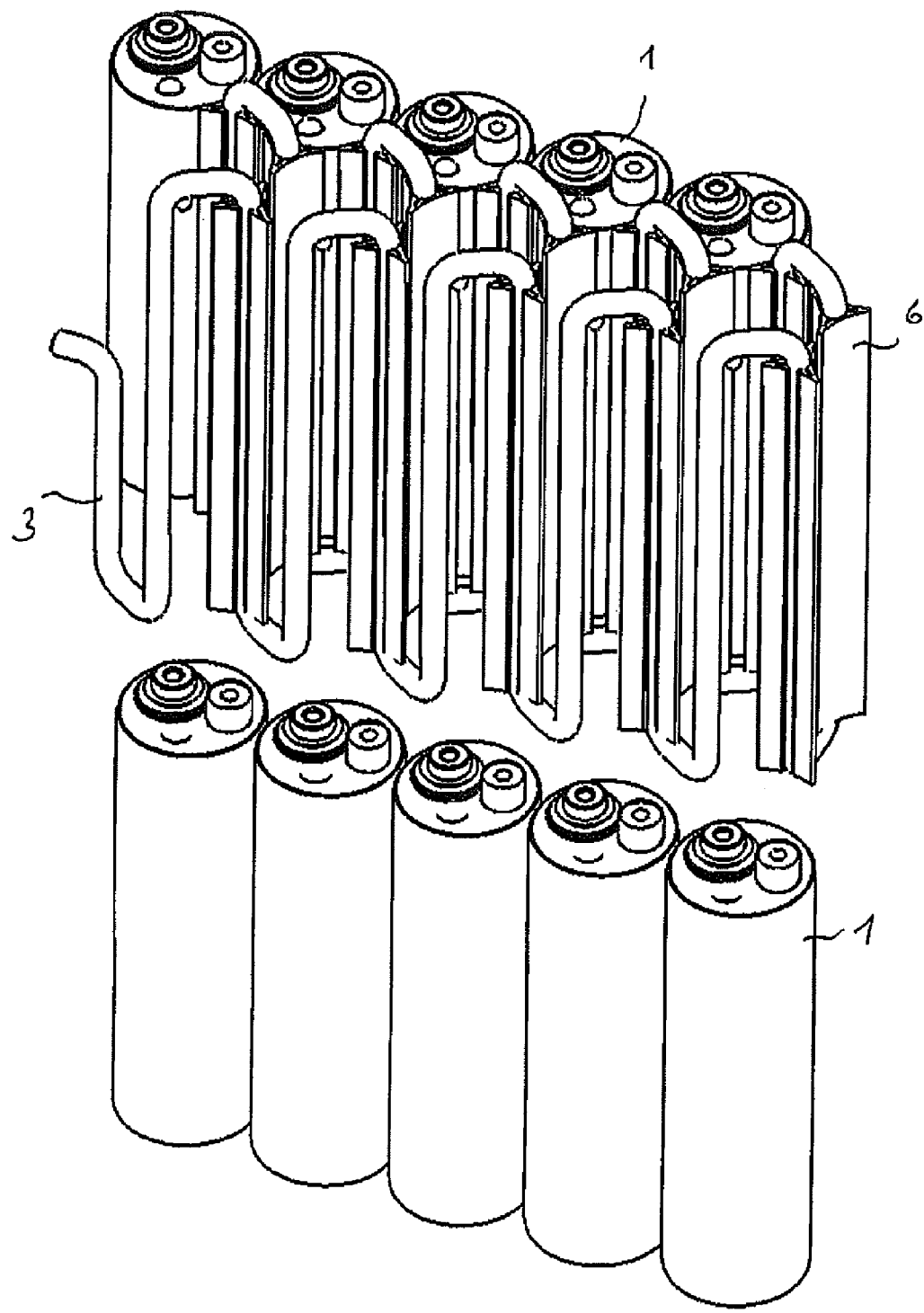
FIG. 11 shows an exploded view of the rechargeable battery.

FIG. 11 shows an exploded view of the rechargeable battery. This clearly shows how the round cells 1 are plugged into the round cell holders which are formed by the extruded output elements 6, which form a heat sink, and the round rod output elements 3 which pass through the output elements 6.

Figure 12:
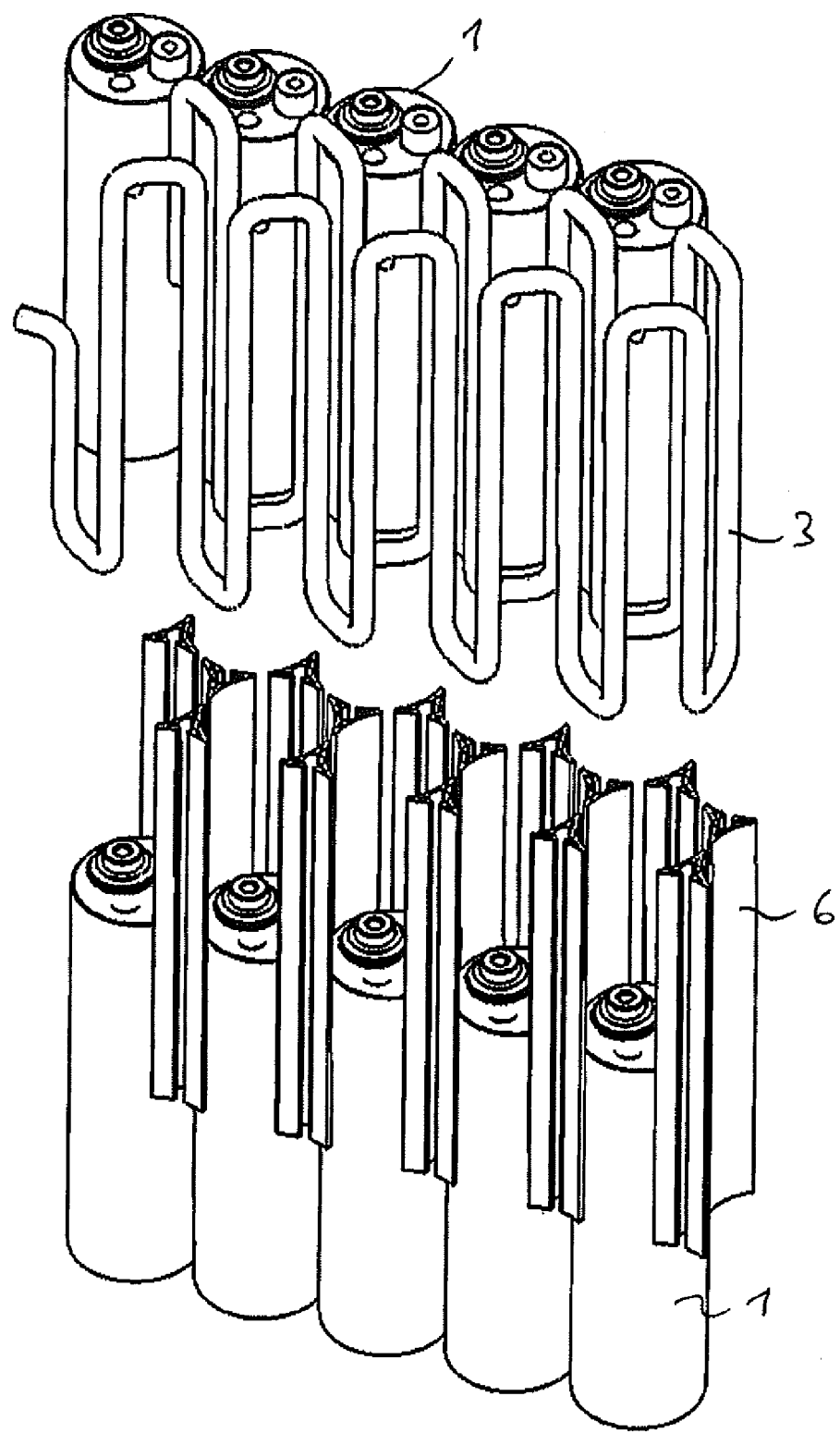
FIG. 12 shows an exploded view of the rechargeable battery.

This can be seen even more clearly in the exploded view in FIG. 12.

Figure 13:
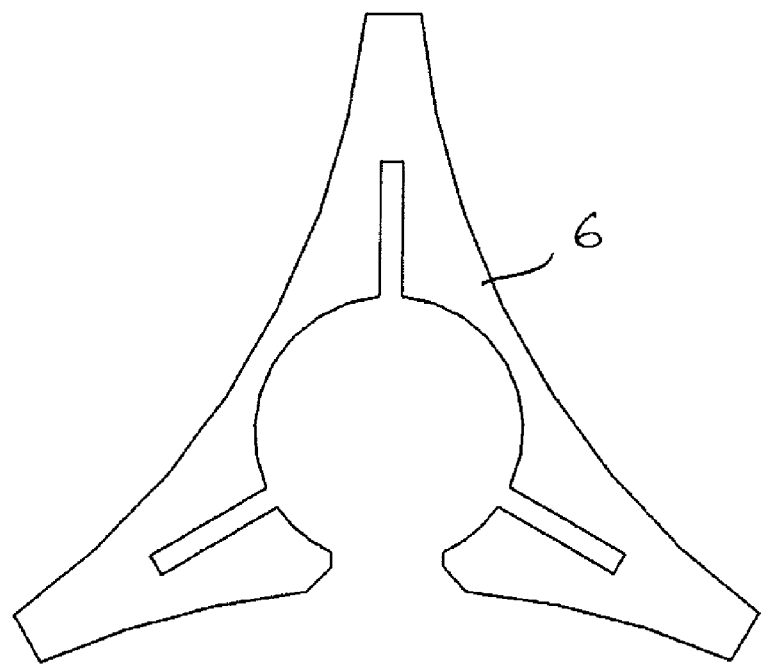
FIG. 13 shows a plan view of the output element from FIG. 8.

FIG. 13 shows a plan view of the output element 6 from FIG. 8.

Figure 14:
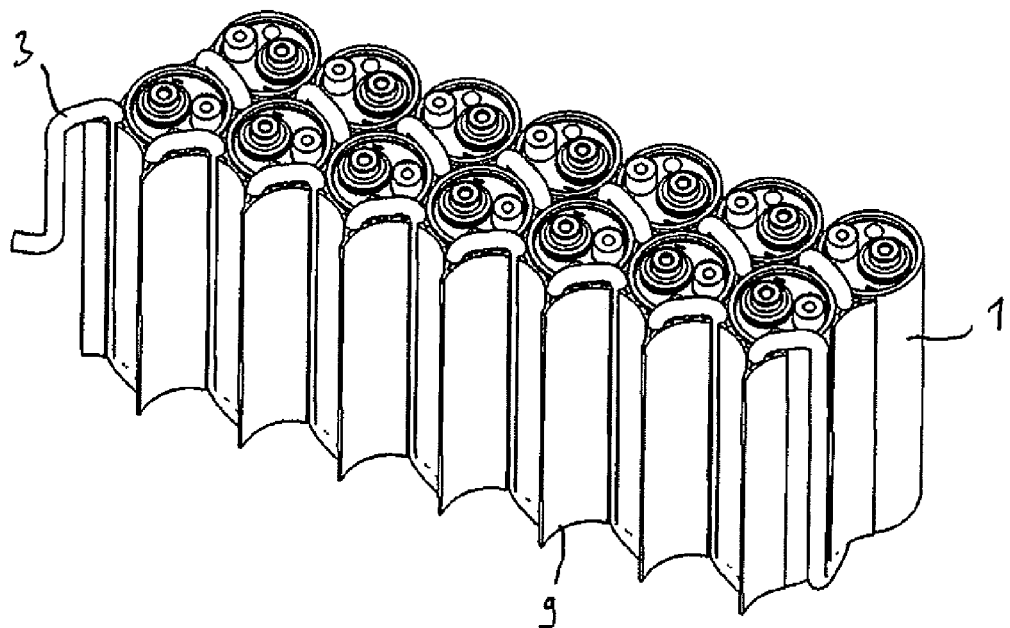
FIG. 14 shows a different embodiment of a rechargeable battery, in which an output element extends integrally over preferably the entire length of the rechargeable battery.

FIG. 14 shows a different embodiment of a rechargeable battery, in which an output element 9 extends integrally over preferably the entire length of the rechargeable battery and, for example as illustrated, holds 7 rechargeable batteries and corresponding partially circular walls for this purpose.

Figure 15:
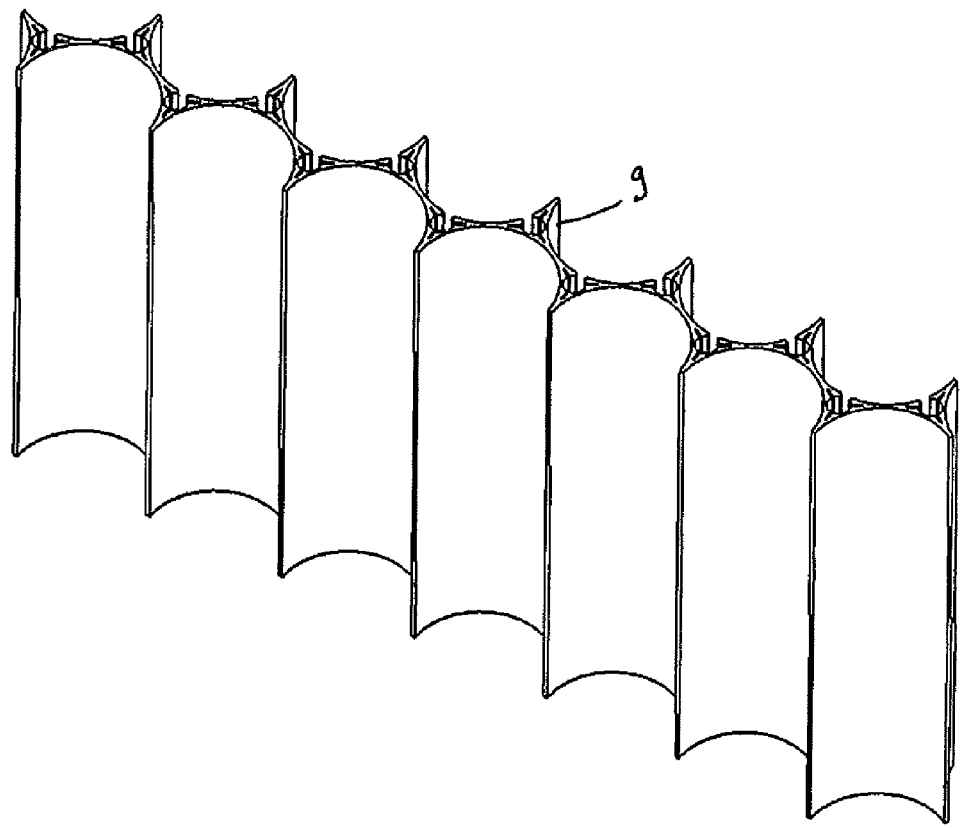
FIG. 15 shows the output element of FIG. 14 in more detail.

The embodiment of the output element 9 is shown in more detail in FIG. 15. The hole for holding the round rod output elements 3 and the incisions are comparable to the output elements 8 in the second embodiment.

Figure 16:
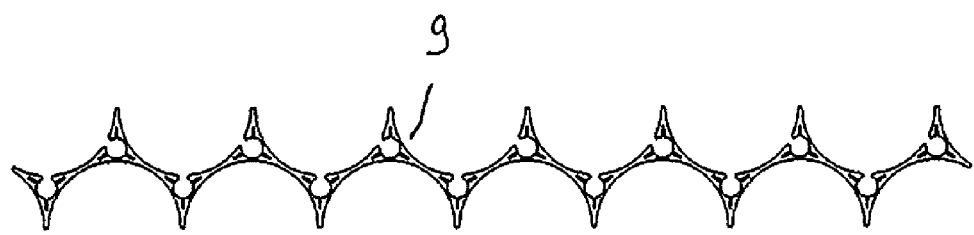
FIG. 16 shows a plan view of the output element from FIG. 15.

FIG. 16 shows a plan view of the output element from FIG. 15.

Figure 17:
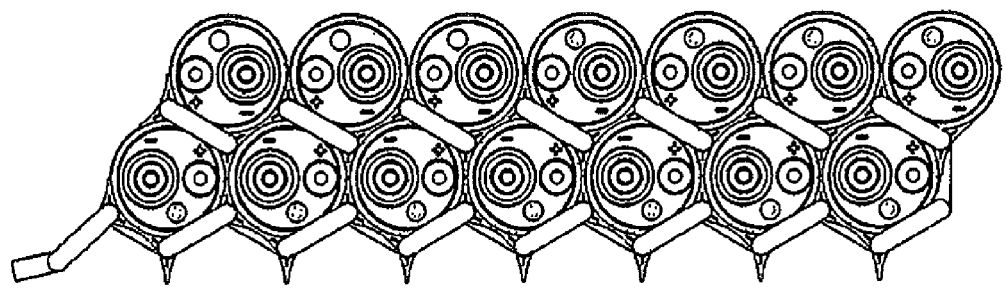
FIG. 17 shows a plan view of the rechargeable battery in the assembled state.

FIG. 17 shows a plan view of the rechargeable battery in the assembled state.

Figure 18:
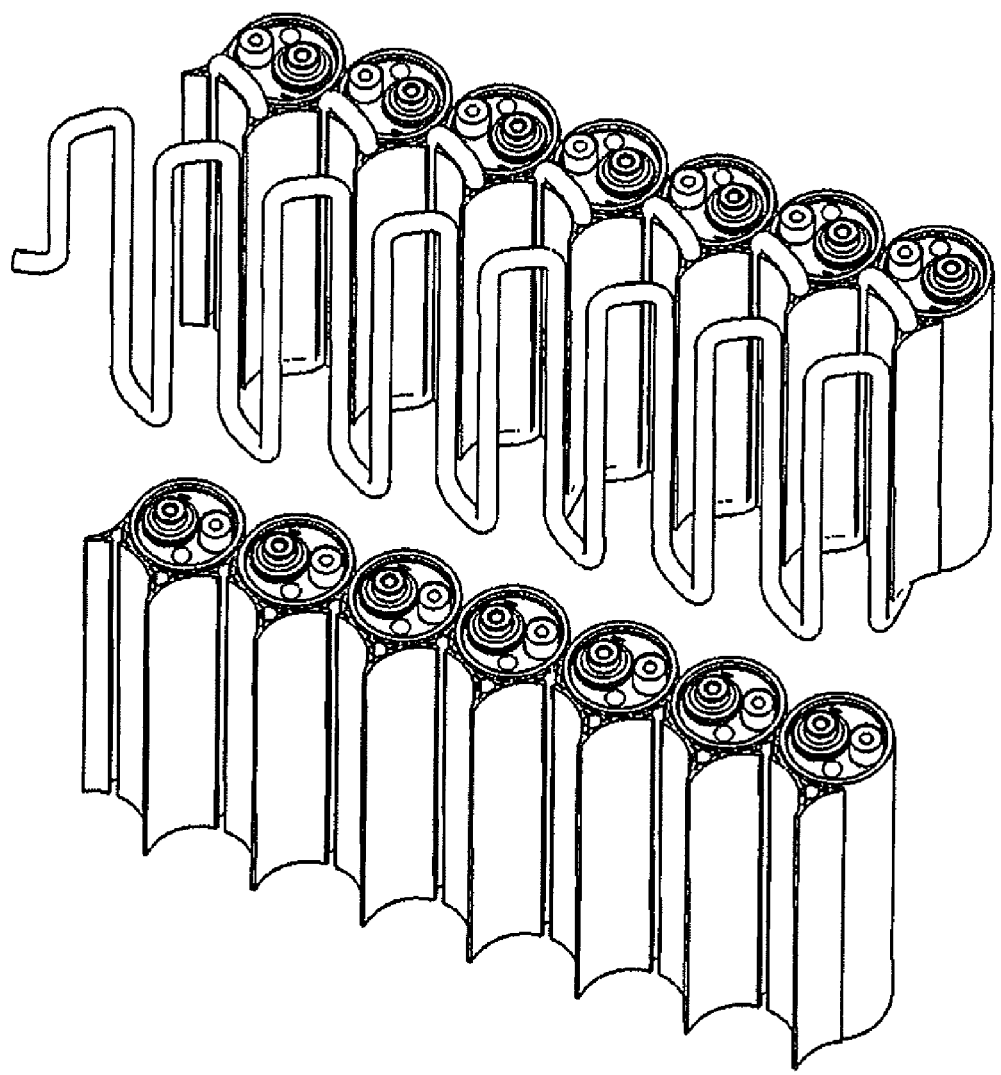
FIG. 18 shows an exploded view.

FIG. 18 shows an exploded view.

What is claimed is:

1. A round cell rechargeable battery comprising:
a plurality of round cells arranged alongside one another, each of the round cells comprising a lower face at a first end of the round cell and an upper face provided at a second end of the round cell opposite the first end, the upper and lower faces connected by a side wall, the upper face having at least one pole connection;
at least one heat sink element that is electrically insulated from the round cells;
wherein the at least one heat sink element is in the form of a rod and is curved such that the heat sink element runs in a zigzag shape alternately along the lower face, the side wall adjacent thereto, and the upper face of the round cells and thermally conductively connects a group of the round cells for heat dissipation.

2. The round cell rechargeable battery of claim 1, wherein the round cells are held in at least one heat sink holding element which is shared by a group of round cells, wherein the heat sink holding element has a holding contour that is matched to the side-wall surfaces of the round cells such that these side-wall surfaces rest on the inner wall of an associated heat sink holding element, wherein the heat sink holding element also includes a holding hole for holding the at least one heat sink elements.

3. The round cell rechargeable battery of claim 2, wherein the inner walls of the heat sink holding elements adjacent to the round cells are curved.

4. The round cell rechargeable battery of claim 2, further comprising incisions that project from the holding hole into the heat sink holding element radially with respect to the holding holes.

5. The round cell rechargeable battery of claim 2, wherein the at least one heat sink holding element is formed from a plastic that is thermally conductive and electrically insulating.

6. The round cell rechargeable battery of claim 2, wherein the heat sink holding element has a coating on an outer surface thereof that is electrically insulating and thermally conductive.

7. The round cell rechargeable battery of claim 2, wherein the heat sink holding element has a ceramic filling.

8. The round cell rechargeable battery of claim 1, wherein the round cells have a housing with a hexagonal cross section that comprises grooves on the side edges of the housing for holding sections of the heat sink element.

9. The round cell rechargeable battery of claim 1, wherein the at least one heat sink element is formed from a plastic that is thermally conductive and electrically insulating.

10. The round cell rechargeable battery of claim 1, wherein each of the round cells includes a housing that has a coating on an outer surface thereof that is electrically insulating and thermally conductive.

11. The round cell rechargeable battery of claim 1, wherein the at least one heat sink element has a coating on an outer surface thereof that is electrically insulating and thermally conductive.

12. The round cell rechargeable battery of claim 1, wherein the at least one heat sink element has a ceramic filling.

* * * * *